(12) United States Patent
You et al.

(10) Patent No.: US 9,648,149 B2
(45) Date of Patent: May 9, 2017

(54) METHOD AND DEVICE FOR INDICATING PLCP HEADER TRANSMISSION MODE

(71) Applicant: LG ELECTRONICS INC., Seoul (KR)

(72) Inventors: Hyang Sun You, Anyang-si (KR); Yong Ho Seok, Anyang-si (KR); Jong Hyun Park, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 288 days.

(21) Appl. No.: 14/350,781

(22) PCT Filed: Oct. 31, 2012

(86) PCT No.: PCT/KR2012/009015
§ 371 (c)(1),
(2) Date: Apr. 9, 2014

(87) PCT Pub. No.: WO2013/069918
PCT Pub. Date: May 16, 2013

(65) Prior Publication Data
US 2014/0286356 A1      Sep. 25, 2014

Related U.S. Application Data

(60) Provisional application No. 61/558,438, filed on Nov. 11, 2011.

(51) Int. Cl.
*H04L 29/06* (2006.01)
*H04L 27/26* (2006.01)
(Continued)

(52) U.S. Cl.
CPC ............ *H04L 69/22* (2013.01); *H04L 1/0025* (2013.01); *H04L 1/0681* (2013.01); *H04L 1/08* (2013.01);
(Continued)

(58) Field of Classification Search
CPC ....................................................... H04L 69/22
See application file for complete search history.

(56) References Cited

U.S. PATENT DOCUMENTS 7,385,929 B1 *  6/2008  McFarland ........... H04L 1/0045
                                                     370/243
2005/0136933 A1 * 6/2005  Sandhu ................. H04L 1/0075
                                                     455/450
(Continued)

FOREIGN PATENT DOCUMENTS

| JP | 2011-166258 A | 8/2011 |
|---|---|---|
| KR | 10-2011-0046330 A | 5/2011 |
| KR | 10-2011-0046378 A | 5/2011 |
| KR | 10-2011-0051129 A | 5/2011 |
| KR | 10-2011-0098588 A | 9/2011 |
| WO | 2011/034865 A1 | 3/2011 |

OTHER PUBLICATIONS

IEEE P802.11 Wireless LANs, "Specification Framework for TGac", IEEE 802. 11-09/0992r21, Jan. 2011, pp. 1-8.

*Primary Examiner* — Robert M Morlan
*Assistant Examiner* — Nourali Mansoury
(74) *Attorney, Agent, or Firm* — Lee Hong Degerman Kang & Waimey (57) ABSTRACT

Disclosed are method and device for indicating a PLCP header transmission mode. A method for generating a physical layer convergence protocol (PLCP) of a data frame can comprise the following steps: demodulating PLCP header mode information based on a scrambling sequence of the received frame or information elements included in the received frame; and generating a data frame including the PLCP header generated based on the PCLP header mode information. The PLCP header mode information comprises at least one indication from a space time block coding mode indication, a guard interval mode indication, and a repetition mode indication. The invention is capable of improving data (Continued)

transmission efficiency by adaptively determining a transmission mode of a PCLP header to a channel situation.

8 Claims, 9 Drawing Sheets

(51) Int. Cl.
*H04L 1/00* (2006.01)
*H04L 1/08* (2006.01)
*H04L 1/06* (2006.01)
*H04W 4/00* (2009.01)
*H04W 80/02* (2009.01)

(52) U.S. Cl.
CPC ......... *H04L 27/2666* (2013.01); *H04W 4/005* (2013.01); *H04W 80/02* (2013.01)

(56) References Cited

U.S. PATENT DOCUMENTS

| | | | | |
|---|---|---|---|---|
| 2007/0183383 | A1* | 8/2007 | Bitran | H04W 88/06 370/338 |
| 2011/0032875 | A1* | 2/2011 | Erceg | H04B 7/0452 370/328 |
| 2011/0280168 | A1* | 11/2011 | Lee | H04W 52/0203 370/311 |
| 2011/0319123 | A1* | 12/2011 | Kwun | H04W 52/16 455/522 |
| 2012/0281774 | A1* | 11/2012 | Lee | H04B 7/0452 375/260 |
| 2012/0314673 | A1* | 12/2012 | Noh | H04W 72/042 370/329 |

* cited by examiner

METHOD AND DEVICE FOR INDICATING PLCP HEADER TRANSMISSION MODE

CROSS-REFERENCE TO RELATED APPLICATIONS

This application is the National Stage filing under 35 U.S.C. 371 of International Application No. PCT/KR2012/009015, filed on Oct. 31, 2012, which claims the benefit of U.S. Provisional Application Ser. No. 61/558,438, filed on Nov. 11, 2011, the contents of which are all hereby incorporated by reference herein in their entirety.

BACKGROUND OF THE INVENTION

Field of the Invention

The present invention relates to wireless communication and, more particularly, to a method and apparatus for indicating PLCP header transmission mode.

Related Art

A Machine-to-Machine (M2M) system has recently been in the spotlight as the next-generation communication technology. In the IEEE 802.11 WLAN, a new standard is being established in order to support M2M. An M2M system means a network over which a machine not a human being becomes the main body of communication and exchanges pieces of information. A temperature sensor, a humidity sensor, a camera, home appliances, such as TV, a process machine in a factory, or a large-sized machine, such as a vehicle, may become one of the elements of an M2M system. With the recent advent of various communication services, such as smart grid, e-Health, and ubiquitous, M2M technology is used a lot in order to support the various communication services. An M2M system has the following characteristics.

1) A very large number of STAs: M2M assumes a very large number of STAs unlike an existing network. This is because not only machines owned by persons, but also sensors installed in homes and companies must be taken into consideration. Accordingly, a very large number of STAs may be connected to one AP.

2) Low traffic load per STA: An M2M terminal has a traffic pattern in which surrounding information is collected and reported. Accordingly, information does not need to be frequently transmitted, and the amount of the information is small.

3) Uplink-oriented: M2M is chiefly configured to receive a command in downlink, take action, and then report resulting data in uplink. Thus, uplink becomes the center in M2M because major data is commonly transmitted in uplink.

4) Longer lifespan of an STA: An M2M terminal is chiefly operated by the battery, and a user may not frequently charge the M2M terminal. Accordingly, it is necessary to guarantee a longer life span by minimizing the consumption of the battery.

5) Automatic recovery function: An M2M terminal needs an automatic recovery function because it is difficult for a person to directly manipulate the M2M terminal in a special situation.

SUMMARY OF THE INVENTION

An object of the present invention is to provide a method of indicating preamble transmission mode.

Another object of the present invention is to provide a device for performing a method of indicating preamble transmission mode.

A method of generating the Physical Layer Convergence Protocol (PLCP) header of a data frame according to an aspect of the present invention for achieving an object of the present invention includes steps of demodulating PLCP header mode information based on the scrambling sequence of a received frame or an information element included in the received frame and generating the data frame including a PLCP header generated based on the PLCP header mode information, wherein the PLCP header mode information may include at least one indication of Space Time Block Coding (STBC) mode indication, Guard Interval (GI) mode indication, and repetition mode indication. The STBC mode indication may indicate Space Time Block Coding (STBC) used to generate the PLCP header of the data frame, the GI mode indication may indicate whether a guard interval used to generate the PLCP header of the data frame is a Long Guard Interval (LGI) or a Short Guard Interval (SGI), and the repetition mode indication may indicate whether or not the PLCP header of the data frame has been repeated and generated. The step of demodulating PLCP header mode information based on the scrambling sequence of a received frame or an information element included in the received frame may include steps of demodulating STBC mode information of the PLCP header based on B0 and B1 of the first 7 bits B0, B1, B2, B3, B4, B5, and B6 of the scrambling sequence of the received frame, demodulating SGI mode information of the PLCP header based on B2 of the first 7 bits of the scrambling sequence of the received frame, and demodulating repetition mode information of the PLCP header based on B3 of the first 7 bits B0~B6 of the scrambling sequence of the received frame, wherein the received frame may b a Clear To Send (CTS) frame. The information element may be information included in the data payload of the received frame and may include an STBC field including the STBC mode indication, an SGI field including the SGI mode indication, and a repetition field including the repetition mode indication. The received frame may be a probe response frame. The PLCP header mode information may be information determined adaptively depending on channel conditions.

A wireless terminal according to an aspect of the present invention for achieving an object of the present invention includes a processor for demodulating PLCP header mode information based on the scrambling sequence of a received frame or an information element included in the received frame and generating the data frame including a PLCP header generated based on the PLCP header mode information, wherein the PLCP header mode information may include at least one indication of Space Time Block Coding (STBC) mode indication, Guard Interval (GI) mode indication, and repetition mode indication, the STBC mode indication may indicate Space Time Block Coding (STBC) used to generate the PLCP header of the data frame, the GI mode indication may indicate whether a guard interval used to generate the PLCP header of the data frame is a Long Guard Interval (LGI) or a Short Guard Interval (SGI), and the repetition mode indication may indicate whether or not the PLCP header of the data frame has been repeated and generated. The processor may demodulate STBC mode information of the PLCP header based on B0 and B1 of the first 7 bits B0, B1, B2, B3, B4, B5, and B6 of the scrambling sequence of the received frame, demodulate SGI mode information of the PLCP header based on B2 of the first 7 bits of the scrambling sequence of the received frame, and demodulate repetition mode information of the PLCP header based on B3 of the first 7 bits B0~B6 of the scrambling sequence of the received frame, wherein the received frame may be a Clear To Send (CTS) frame. The information element may be information included in the data payload of the received frame and may include an STBC field including the STBC mode indication, an SGI field including the SGI mode indication, and a repetition field including the repetition mode indication, and the received frame may be a probe response frame. The PLCP header mode information may be information determined adaptively depending on channel conditions.

In accordance with the method and device for indicating preamble transmission mode according to an embodiment of the present invention as described above, transmission mode of a PLCP header is adaptively determined depending on channel conditions because information about transmission mode of the PLCP header of a data frame is transmitted before transmitting the data frame. Accordingly, data transmission efficiency can be efficiently improved using wireless resources depending on channel conditions.

DESCRIPTION OF EXEMPLARY EMBODIMENTS

IEEE 802.11 communication has characteristics basically different from those of a wired channel environment because it is performed in a shared wireless medium.

In a wired channel environment, communication was made possible based on Carrier Sense Multiple Access/Collision Detection (CSMA/CD). For example, when a transmission STA transmits a signal once, the signal may be transmitted up to a reception STA without great signal attenuation because there is no significant change in a channel environment in a wired channel. If two or more signals collide against each other in a wired channel environment, whether or not the signals have collided against each other may be detected because power detected by a reception STA Rx becomes instantly greater than power transmitted by a transmission STA Tx.

Unlike in a wired channel environment, however, in a wireless channel environment, various factors (e.g., the attenuation of a signal according to the distance and instant deep fading) affect a channel. Accordingly, a transmission STA cannot precisely perform carrier sensing on whether or not a reception STA has properly received a signal or whether or not there is a collision between signals in the reception STA.

In order to solve the problem, in 802.11, a signal is transmitted based on a Distributed Coordination Function (DCF) that is a Carrier Sense Multiple Access/Collision Avoidance (CSMA/CA) mechanism.

The Distributed Coordination Function (DCF) performs Clear Channel Assessment (CCA) for sensing a medium for specific duration (e.g., a DCF Inter-Frame Space (DIFS)) before stations (STAs) having data to be transmitted transmit the data.

If, as a result of the CCA, the medium is idle (i.e., the state in which the medium has not been occupied by another STA), an STA may send a signal using the idle medium. If, as a result of the sensing, the medium is in the state in which it has been used by another STA (i.e., busy), an STA may send data after waiting for a random backoff period in addition to a DIFS, assuming that several STAs are already waiting to use the medium.

Figure 1:
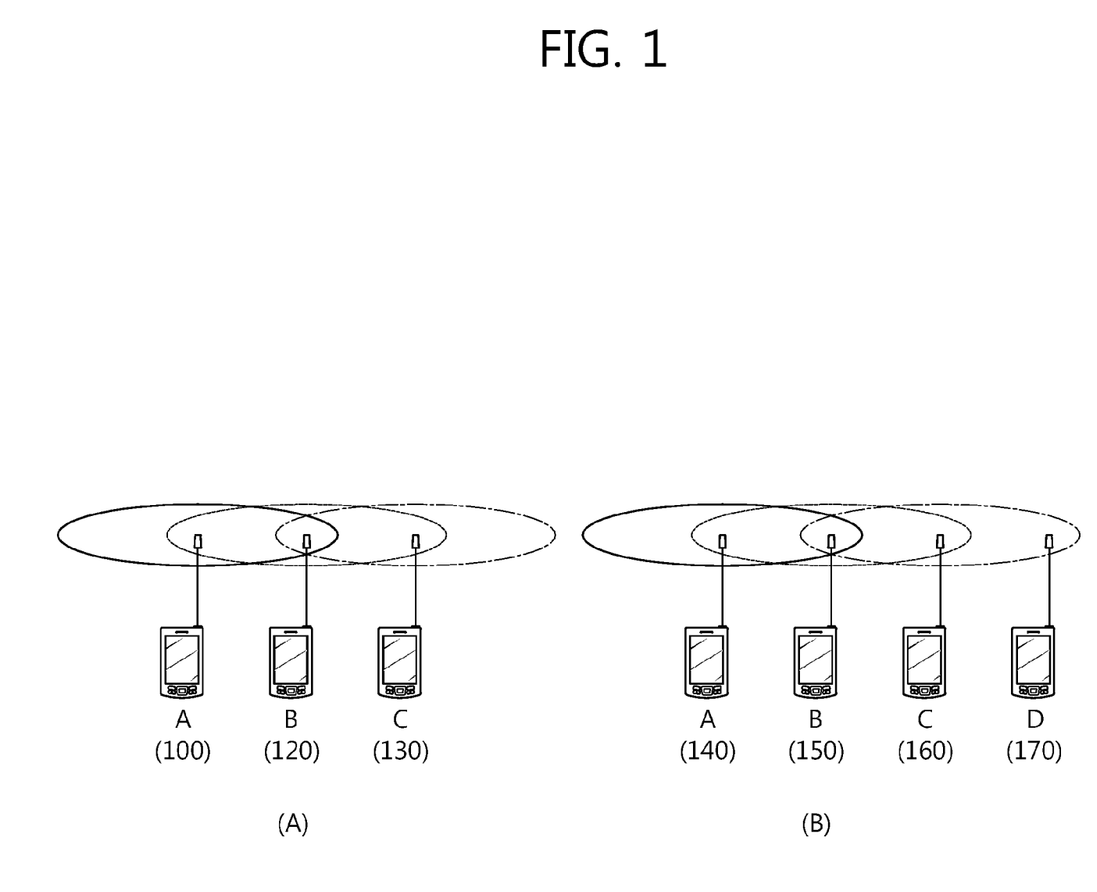
FIG. 1 is a conceptual diagram showing the case where an STA erroneously senses a medium.

In the case where Clear Channel Assessment (CCA) for sensing a medium is performed, if an STA erroneously senses whether the medium is an idle or not, a problem may occur. FIG. 1 below shows the case where an STA erroneously senses whether or not a medium is idle or not.

FIG. 1 is a conceptual diagram showing the case where an STA erroneously senses a medium.

FIG. 1(A) is a conceptual diagram showing a hidden node issue, and FIG. 1(B) is a conceptual diagram showing an exposed node issue.

In FIG. 1(A), it is assumed that an STA A 100 and an STA B 120 are in communication with each other and an STA C 130 has information to be transmitted to the STA B 120. This corresponds to a situation in which the STA A 100 sends information to the STA B 120, and a channel medium through which data is to be transmitted to the STA B 120 has been occupied by the STA A 100. From a viewpoint of the STA C 130, however, there is a possibility that the STA C 130 may determine that the medium through which the data will be transmitted to the STA B 120 is in an idle state when performing carrier sensing on the medium before sending the data to the STA B 120. In such a case, the data is transmitted from the STA C 130 to the STA B 120. As a result, a collision is generated between the data because the STA B 120 receives the pieces of information from both the STA A 100 and the STA C 130. In this case, the STA A 100 may be called a hidden node of the STA C 130.

In FIG. 1(B), it is assumed that an STA B 150 sends data to an STA A 140. An STA C 160 may perform carrier sensing in order to know whether a medium has been occupied or not. In such a case, since the STA B 150 is sending the information to the STA A 140, the state in which the medium has been occupied (i.e., busy) is sensed. As a result, although the STA C 160 wants to send data to an STA D 170, the state in which the medium has been occupied (i.e., busy) is sensed. Accordingly, the STA C 160 must unnecessarily wait until the medium becomes an idle state after the STA B 150 finishes sending the data to the STA A 140.

That is, although the STA A 140 is placed outside the carrier sensing range of the STA C 160, it may prevent the data transmission of the STA C 160. In this case, the STA C 160 becomes an exposed node of the STA B 150.

In order to solve the hidden node issue described in FIG. 1 (A) and the exposed node issue described in FIG. 1(B), whether a medium has been occupied or not can be sensed using an RTS frame and a CTS frame in a WLAN.

Figure 2:
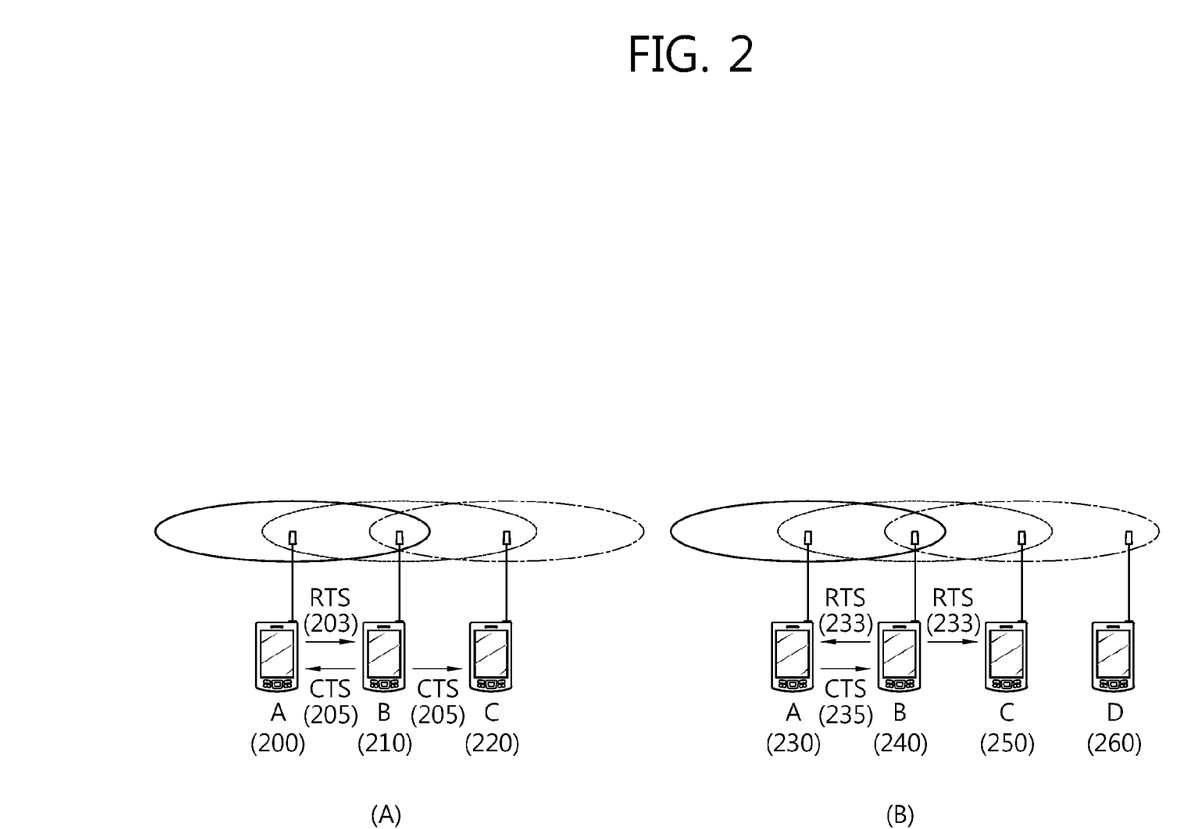
FIG. 2 is a conceptual diagram showing a method using an RTS frame and a CTS frame in order to solve a hidden node issue and an exposed node issue.

FIG. 2 is a conceptual diagram showing a method using a Request To Send (RTS) frame and a Clear To Send (CTS) frame in order to solve a hidden node issue and an exposed node issue.

Referring to FIG. 2, in order to solve a hidden node issue and an exposed node issue, surrounding STAs may overhear whether two STAs send data or not by introducing short signaling frames, such as an RTS frame and a CTS frame.

FIG. 2(A) shows a method of transmitting an RTS frame 203 and a CTS frame 205 in order to solve a hidden node issue.

Assuming that both an STA A 200 and an STA C 220 attempt to send data to an STA B 210, when the STA A 200 sends the RTS frame 203 to the STA B 210, the STA B 210 may send the CTS frame 205 to all the STA A 200 and the STA C 220 placed near the STA B 210. As a result, the STA C 220 may sense that the STA A 200 and the STA B 210 send data to each other. The STA C 220 waits until data transmission between the STA A 200 and the STA B 210 is terminated, thereby being capable of avoiding a collision.

FIG. 2(B) shows a method of transmitting an RTS frame 233 and a CTS frame 235 in order to solve an exposed node issue.

It can be seen that a collision is not generated although an STA C 250 sends data to another STA D 260 by overhearing the transmission of the RTS frame 233 and the CTS frame 235 of an STA A 230 and an STA B 240. That is, the STA B 240 sends the RTS frame 233 to all surrounding STAs and sends the CTS frame 235 to only the STA A 230 that has data to be actually transmitted. The STA C 250 may be aware that the STA A 230 is placed outside the carrier sensing range of the STA C 250 because it receives only the RTS frame 233, but does not receive the CTS frame 235 of the STA A 230. Accordingly, the STA C 250 can send data to the STA D 260.

The RTS frame format and the CTS frame format are disclosed in the 8.3.1.2 RTS frame format and 8.3.1.3 CTS frame format of 802.11 spec.

Figure 3:
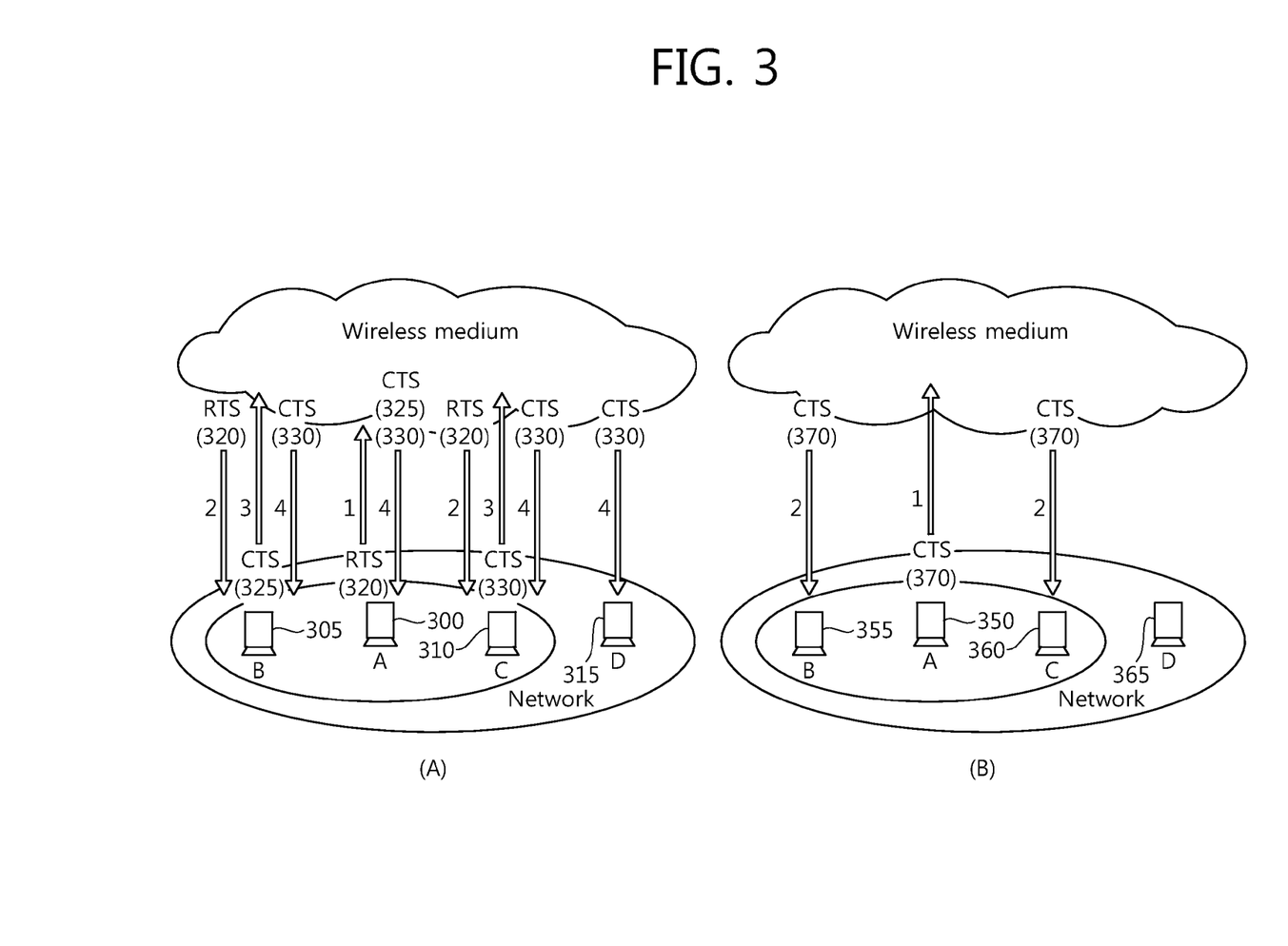
FIG. 3 is a conceptual diagram showing a CTS-to-self mechanism.

FIG. 3 is a conceptual diagram showing a CTS-to-self mechanism.

FIG. 3 shows a comparison between a case A where a medium is sensed using an RTS frame and CTS frame exchange method and a case B where a medium using a CTS-to-self frame is sensed.

In the IEEE 802.11g standard, a CTS-to-self protection mechanism has been defined. The CTS-to-self protection mechanism may be used instead of a medium sensing mechanism using an RTS frame and a CTS frame. If the CTS-to-self protection mechanism is used, the overhead of a medium can be reduced as compared with the case where a medium sensing mechanism using RTS/CTS frames is used. However, unlike in the case where RTS/CTS frames are used, CTS-to-self is not an effective solution to a hidden node issue.

Referring to FIG. 3(A), a method of exchanging an RTS frame and a CTS frame before a transmission STA sends a data frame may be performed as follows.

In FIG. 3(A), it is assumed that an STA A 300 attempts to send a data frame to an STA C 310.

1) First, the STA A 300 sends an RTS frame 320.
2) The transmitted to RTS frame 320 is transmitted to an STA B 305 and the STA C 310 that are present in its carrier sensing range.
3) The STA B 305 and the STA C 310 send CTS frames 325 and 330.
4) The transmitted CTS frames 325 and 330 are transmitted to the STA A 300, the STA B 305, the STA C 310, and an STA D 315.

The STA D 315 has not received the RTS frame 320 from the STA A 300 because it is placed outside the carrier sensing range of the STA A 300 (i.e., the STA D 315 is a hidden node of the STA A 300). However, the STA D 315 may be aware that the STA A 300 has occupied a medium in order to send data by receiving the CTS frame 330 from the STA C 310.

5) The STA A 300 sends the data frame to the STA C 310.

Referring to FIG. 3(B), a medium sensing method using a CTS-to-self frame, performed before a transmission STA sends a data frame, may be performed as follows. In FIG. 3(B), it is assumed that an STA A 350 attempts to send a data frame to an STA C 360.

1) The STA A 350 sends a CTS-to-self frame to an STA B 355 and the STA C 360 that are present in its carrier sensing range.
2) The STA B 355 and the STA C 360 that have received the CTS-to-self frame defer the transmission of other data frames in order to receive a data frame from the STA A 350.

If such a method is used, an STA D 365 placed outside the coverage area of the STA A 350 does not receive a CTS frame 370 from the STA A 350. Accordingly, the STA D 365 does not obtain information about whether or not data is transmitted by the STA A 350.

In such a case, a collision may occur between data frames when the STA D 365 sends a data frame to the STA A 350 or the STA C 360. That is, the method using the CTS-to-self frame 370 cannot solve a hidden node issue. Accordingly, the method using the CTS-to-self frame 370 needs to be applied to only a case where the transmission of data frames between STAs can be sensed. In other cases, a medium needs to be sensed using the RTS/CTS frame exchange method.

Hereinafter, embodiments of the present invention disclose methods of exchanging pieces of information about modes that are used to generate the PLCP header of a data frame upon exchange of a CTS frame, an RTS frame, and a CTS-to-self frame which is performed before a data frame is transmitted in a frequency band of sub 1 GHz. Detailed embodiments are described below.

In IEEE 802.11ah, an operation in a frequency band of sub 1 GHz is defined. The IEEE 802.11ah standard has a significant characteristic in that it has much wider coverage (up to 1 km) than an existing indoor-based WLAN in the non-licensed band of sub 1 GHz except TV white space bands. That is, unlike existing 2.4 GHz or 5 GHz, if a WLAN is used in the sub 1 GHz band represented by 700~900 MHz, the coverage of an AP is extended about 2 to 3 times due to the propagation characteristic of the corresponding band assuming that the power is the same.

In order to increase coverage to which a transmitted frame reaches up to 1 km in an outdoor environment, robustness needs to be increased when sending a PLCP header.

In order to increase the robustness of a PLCP header, a repetition structure generated by performing repetition on the PLCP header may be used. If the repetition structure based on repetition is used in the PLCP header, there is an advantage in that a range in which a data frame may reach is increased. However, there is a disadvantage in that the overhead of a preamble is increased because the length of the preamble of a data frame is too long.

A data frame having a PLCP header to which repetition has been applied is required to send a frame to an STA placed at a long distance without an error. However, to send data to STAs placed at a relatively short distance from an AP using a frame format including a preamble having a repetition structure may be the waste of resources. Accordingly, if a method of generating a preamble may be adaptively changed when a frame is transmitted to an STA placed at a short distance and when a frame is transmitted to an STA placed at a long distance, the throughput of data transmission can be increased and the power consumption of an STA can be reduced.

Hereinafter, in an embodiment of the present invention, when generating the PLCP header of a data frame, a terminal may flexibly generate the PLCP header depending on environments differently using a method of generating the PLCP header adaptively depending on a channel environment.

For example, a PLCP header having a different format may be generated by differently applying 1) Space Time Block Coding (STBC) used to generate the PLCP header, 2) a guard interval included in the PLCP header, and 3) whether or not to use a repetition format in the PLCP header depending on channel environments.

STBC, an SGI, and a repetition format that may be differently applied when generating a PLCLP header are described below.

(1) Space Time Block Coding (STBC)

In a WLAN, several types of STBC are defined and used, and an appropriate constellation mapper of STBC has been designated depending on the number of antennas used in transmission. A system has different performance and the data transmission rate is also different depending on whether STBC is used or not and what constellation mapper is used. Terminals to which MIMO may be applied may use STBC in order to send a preamble as well as in order to send a data payload. In this case, the length of a preamble and a reachable length may be different depending on the type of STBC applied to the preamble.

Various STBC methods have been disclosed in IEEE 802.11 20.3.11.9.2 Space-Time Block Coding (STBC).

(2) a Short Guard Interval (SGI)

In IEEE 802.11n and 802.11ac, a Short Guard Interval (SGI) is supported in order to prevent interference between symbols. Even in 802.11ah, an SGI is supported. Currently, information about whether or not an SGI and an LGI are used is included in the SIG field of a PLCP header and indicated. Information about whether a Short Guard Interval (SGI) will be used or a Long Guard Interval (LGI) will be used in a payload that follows a PLCP header may be aware based on a SIG field. In an existing PLCP header, only an LGI is used, and an SGI may not be selectively used. However, if an LGI and an SGI are selectively used even in a PLCP header, the length of a preamble can be reduced. Accordingly, if an LGI and an SGI may be adaptively used depending on a channel environment, it may help reduce the length of a preamble.

(3) Repetition Mode

In IEEE 802.11ah, in order to increase coverage to which a frame reaches, repetition mode is sought to be introduced into a preamble. A preamble using repetition is advantageous in that a range to which the preamble reaches without an error can be increased. However, if repetition is used, there is a disadvantage in that the length of a PLCP header is much lengthened. If repetition mode is used in the PLCP header of a frame that will be transmitted to a terminal placed at a short distance in a unicast environment, resources may be unnecessarily wasted. If whether or not to apply repetition to a preamble can be controlled depending on environments in order to prevent such an unnecessary waste of resources, it may help prevent an unnecessary increase in the length of the preamble.

In accordance with an embodiment of the present invention, information about the type of STBC used to generate a PLCP header, whether or not a Short Guard Interval (SGI) has been used in a PLCP header, and whether or not a repetition structure has been used in a PLCP header may be indicated using a CTS frame/RTS frame, a CTS-to-self frame, and a management frame, that is, frames exchanged prior to the transmission of a data frame.

That is, STBC, a GI, and repetition to be used in the PLCP header of a data frame may be selected and indicated by including information about STBC mode indication, SGI/LGI mode indication, and repetition mode indication in the RTS frame, the CTS frame, and the CTS-to-self frame or the management frame so that a data frame can be transmitted and received depending on a selected option.

Hereinafter, in an embodiment of the present invention, information, such as STBC mode indication, SGI/LGI mode indication, and repetition mode indication, is defined and used as PLCP header mode information.

The PLCP header mode information may include other transmission mode in addition to STBC mode indication, SGI/LGI mode indication, and repetition mode indication. Furthermore, some transmission modes of the STBC mode indication, the SGI/LGI mode indication, and the repetition mode indication may be used as PLCP header mode information.

Hereinafter, in an embodiment of the present invention, an example in which all the STBC mode indication, the SGI/LGI mode indication, and the repetition mode indication are used as indication information is described for convenience of description.

Figure 4:
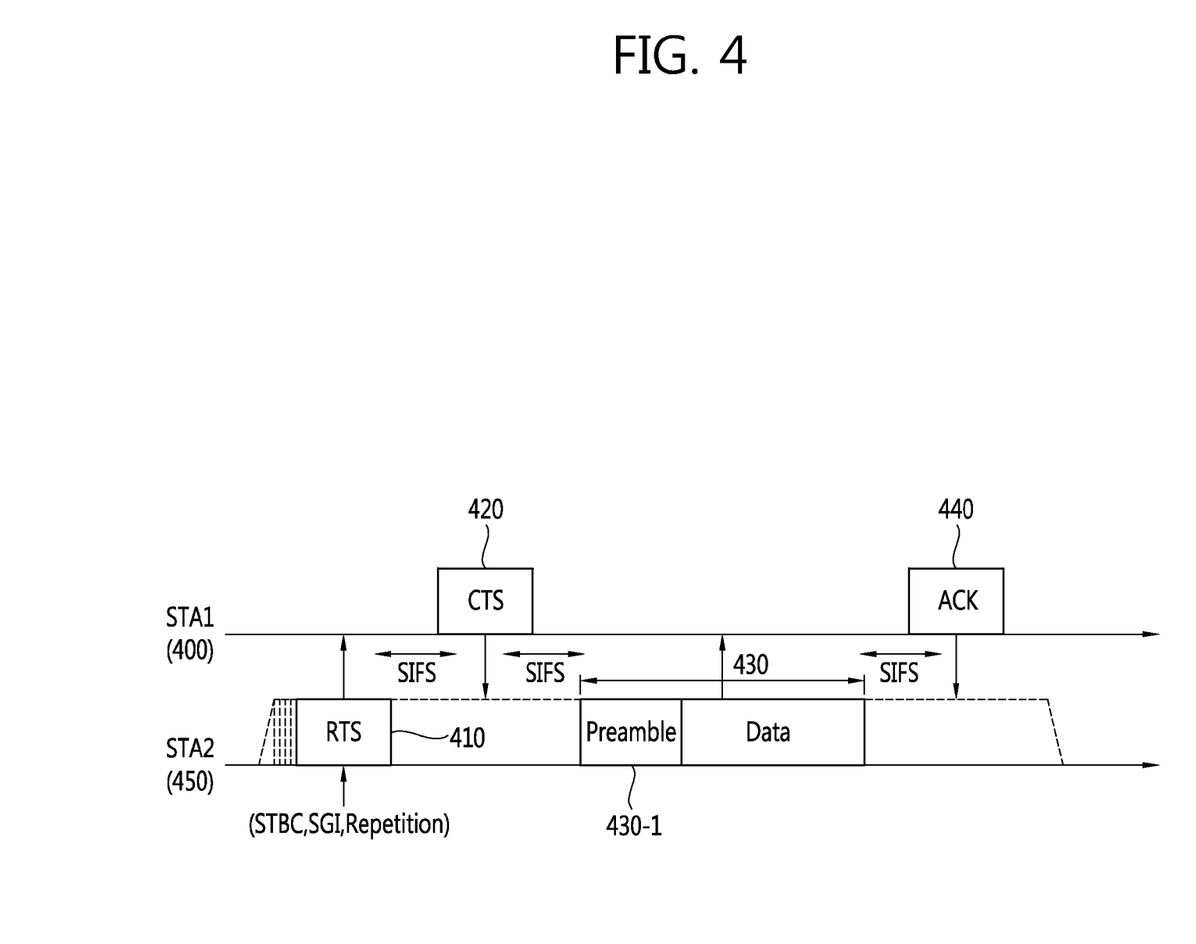
FIG. 4 is a conceptual diagram showing a method of transmitting PLCP header mode information based on an RTS frame in accordance with an embodiment of the present invention.

FIG. 4 is a conceptual diagram showing a method of transmitting PLCP header mode information based on an RTS frame in accordance with an embodiment of the present invention.

Referring to FIG. 4, it is assumed that the PLCP header mode information includes all of STBC mode indication, SGI/LGI mode indication, and repetition mode indication.

An STA 2 450 sends an RTS frame 410 including PLCP header mode information.

In accordance with an embodiment of the present invention, PLCP header mode information may be transited through the RTS frame 420. The PLCP header mode information may be transmitted through the first 7 bits of a scrambling sequence for scrambling the RTS frame 410.

Table 1 below shows the first 7 bits of the scrambling sequence.

TABLE 1

| DYN_BANDWIDTH_IN_NON_HT | First 7 bits of scrambling sequence | | | | | | |
|---|---|---|---|---|---|---|---|
| Not present | 5 bit pseudo-random nonzero integer of CH_BANDWIDTH_IN_NON_HT equals NON_HT_CBW20 and 5 bit pseudo-random integer otherwise | | | | | 0(NON_HT_CBW20) 1(NON_HT_CBW40) 2(NON_HT_CBW80) 3(NON_HT_CBW160)/ (NON_HT_CBW80 + 80) | |
| present | STBC (1 bit or 2 bit) | | SGI (1 bit) | Repetition (1 bit) | 0(Static) 1(Dynamic) | | |
| | B0 | B1 | B2 | B3 | B4 | B5 | B6 |

Referring to Table 1, B0~B4 that belong to the first 7 bits of a scrambling sequence for generating an existing RTS frame have been set as pseudo random non-zero integer values. In an embodiment of the present invention, information about the PLCP header mode of a data frame may be transmitted using the B0~B4 used as the pseudo random non-zero integers.

Information about the PLCP header mode of a data frame that will be subsequently transmitted may be indicated using B0~B4 as STBC mode indication, B2 as SGI mode indication, and B3 as repetition mode indication, of B0~B1.

As described above, Table 1 shows an embodiment in which all of STBC mode indication, SGI/LGI mode indication, and repetition mode indication will be used in PLCP header mode information. A mapping relationship between the scrambling sequence bits and the mode indication (i.e., STBC mode indication, SGI/LGI mode indication, and repetition mode indication) is random and may be changed. Furthermore, the mode indication may be transmitted using another sequence other than other reserved bits or a scrambling sequence. Furthermore, if parameters used as PLCP header mode information are changed, a mapping relationship between the scrambling sequence bits and the mode indication may be changed.

The mode indication may be adaptively changed depending on channel environments. For example, if the STA 2 450 and an STA 1 400 are placed at a close distance from each other, transmission may be performed by setting a PLCP guard interval as an SGI and setting PLCP header mode information so that repetition is not performed. Furthermore, STBC may be selectively used depending on channel environments.

In response to the RTS frame 410 transmitted by the STA 2 450, the STA 1 400 sends a CTS frame 420.

The STA 1 400 may receive the RTS frame 410 transmitted by the STA 2 450 and obtain PLCP header mode indication information based on the scrambling sequence of the RTS frame 410. The STA 1 400 may obtain information regarding that the PLCP header 430-1 of a data frame to be transmitted by the STA 1 400 will be transmitted with what PLCP header mode.

The STA 2 450 receives the CTS frame 420 transmitted by the STA 1 400 and sends the data frame 430.

The PLCP header 430-1 of the data frame may be generated by determining a STBC method for the preamble, a guard interval used in the preamble, and whether or not to repeat the preamble based on STBC mode indication, SGI/LGI mode indication, and repetition mode indication information included in the scrambling sequence of the RTS frame 410 that has been previously transmitted.

The STA 1 400 sends an ACK frame 440 in response to the transmitted data frame 430.

Furthermore, if the STA 1 400 has a data frame to be transmitted to the STA 2 450, the STA 1 400 may generate the data frame including the PLCP header 430-1 generated in the same PLCP header mode as that of the STA 2 450 using the PLCP header mode information transmitted through the RTS frame 410 of the STA 1 400.

In FIG. 4, PLCP header mode indication information has been illustrated as being included in an RTS frame and transmitted, but PLCP header mode indication information may also be included in a CTS frame and transmitted.

Figure 5:
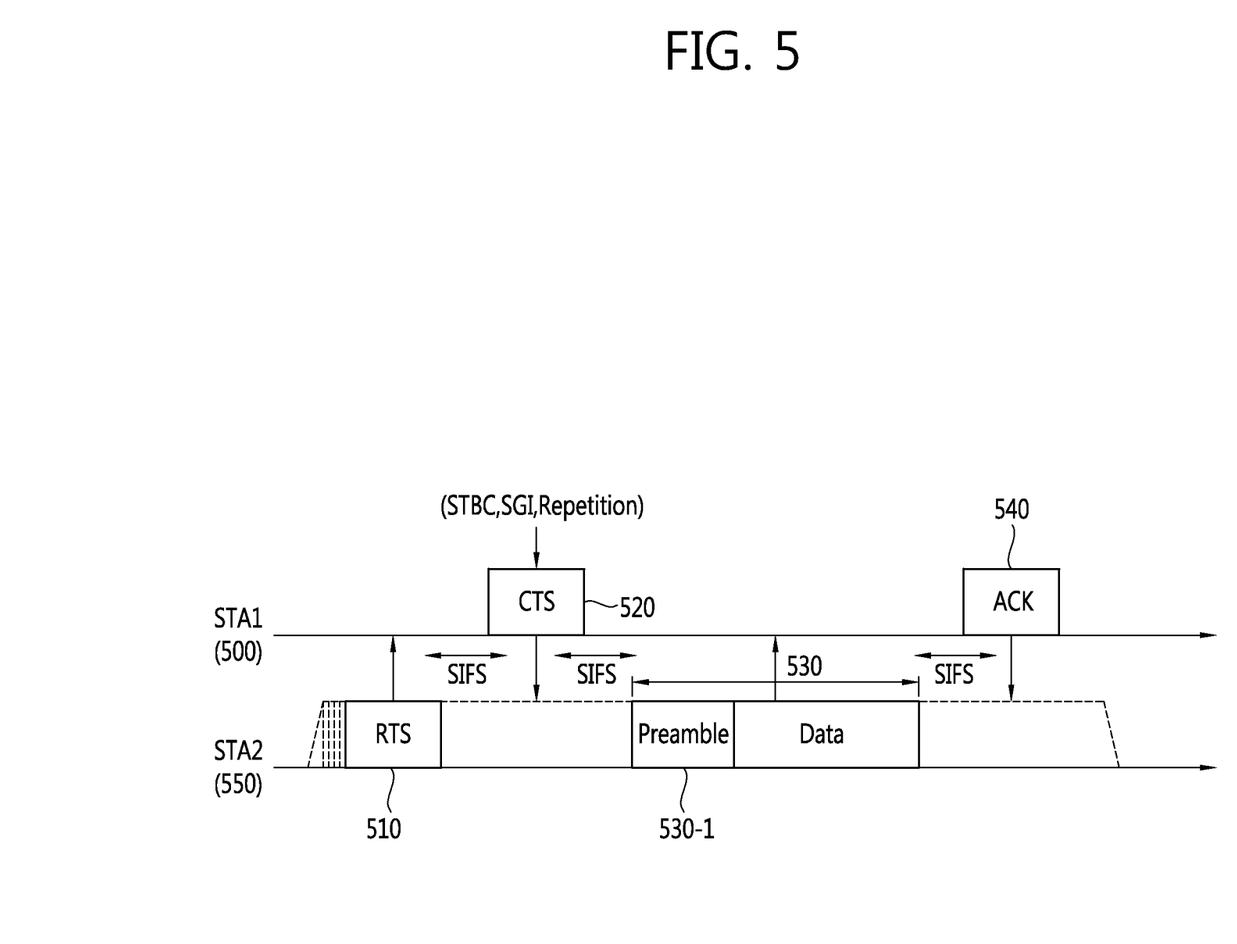
FIG. 5 is a conceptual diagram showing a method of transmitting PLCP header mode information based on a CTS frame in accordance with an embodiment of the present invention.

FIG. 5 is a conceptual diagram showing a method of transmitting PLCP header mode information based on a CTS frame in accordance with an embodiment of the present invention.

Referring to FIG. 5, (1) an STA 2 550 may send an RTS frame 510 to an STA 1 500.

(2) The STA 2 550 may send a CTS frame 520 to the STA 1 500 in response to the RTS frame 510.

In accordance with an embodiment of the present invention, PLCP header mode information may be transmitted through the CTS frame 520. The PLCP header mode information may be transmitted through the first 7 bits of a scrambling sequence for scrambling the CTS frame 520.

If STBC mode indication, SGI/LGI mode indication, and repetition mode indication are used as the PLCP header mode information, B0~B4 that belong to the first 7 bits of the scrambling sequence may be used to represent the PLCP header mode information as in Table 1.

For example, as in Table 1, information about the PLCP header mode of a data frame that will be subsequently transmitted by the STA 2 550 or the STA 1 500 may be transmitted using B0~B1 as STBC mode indication, B2 as an SGI mode indication, and B3 as repetition mode indication, of B0~B4. A mapping relationship between the PLCP header information and the scrambling sequence is random and may be changed.

(3) The STA 2 550 receives the CTS frame 520 and generates a data frame 530 based on a scrambling sequence included in the CTS frame 520.

The STA 2 550 may receive the CTS frame 520 and demodulate PLCP header mode information (e.g., STBC mode indication, SGI/LGI mode indication, and repetition mode indication) based on a scrambling sequence included in the CTS frame 520. The STA 2 550 may generate the PLCP header 530-1 of the data frame 530 based on the demodulated PLCP header information. By using a method of transmitting PLCP header mode through the CTS frame 520, the PLCP header 530-1 of the data frame may be generated adaptively depending on channel conditions. Accordingly, in the case of a close distance or an excellent channel state, medium efficiency can be increased because the length of a PLCP header is reduced (e.g., if a channel state is not good, the PLCP header of a data frame is generated using a Long Guard Interval (LGI) and repetition).

(4) The STA 1 500 sends ACK 540 to the data frame 530 transmitted by the STA 2 550.

The STA 1 500 may receive the data frame 530 including the PLCP header 530-1 that has been generated using the PLCP header mode information transmitted by the STA 2 550 through the CTS frame 520. If there is no error in the received data frame 530, the STA 2 550 may send the ACK frame 540.

Furthermore, if the STA 1 500 sends a data frame to the STA 2 550, the STA 1 500 may generate the PLCP header 530-1 of the data frame using the same information as the PLCP header mode information that has been transmitted to the STA 2 550 through the CTS frame 520.

FIGS. 4 and 5 disclose a method of transmitting PLCP header mode information when using a method of exchanging an RTS frame and a CTS frame. In accordance with an embodiment of the present invention, PLCP header mode information may be transmitted using a CTS-to-self frame.

Figure 6:
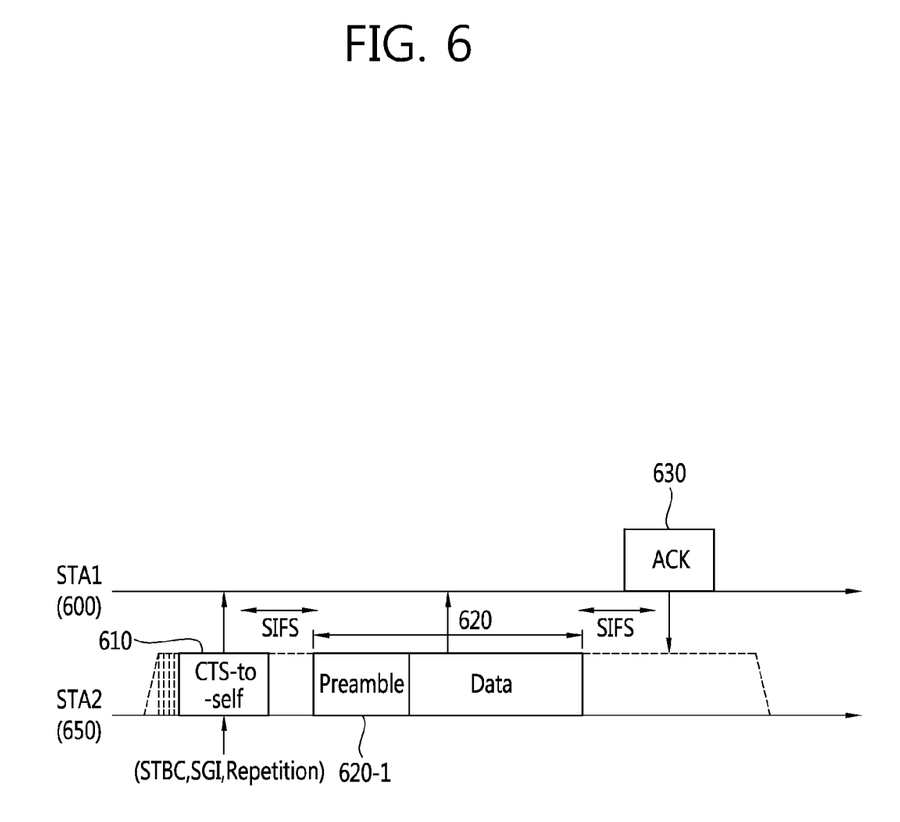
FIG. 6 is a conceptual diagram showing a method of transmitting PLCP header mode information using a CTS-to-self frame in accordance with an embodiment of the present invention.

FIG. 6 is a conceptual diagram showing a method of transmitting PLCP header mode information using a CTS-to-self frame in accordance with an embodiment of the present invention.

Referring to FIG. 6, (1) an STA 2 650 may send a CTS-to-self frame 610 to an STA 1 600.

Like in a method of transmitting PLCP header mode through an RTS frame and a CTS frame, PLCP header mode information may be transmitted through the first 7 bits of a scrambling sequence for scrambling the CTS-to-self frame 610. For example, information about the PLCP header mode of a data frame to be subsequently transmitted by the STA 2 650 or the STA 1 600 may be transmitted using B0~B1 as STBC mode indication, B2 as SGI mode indication, and B3 as repetition mode indication, of B0~B4, even in the CTS-to-self frame 610, as in Table 1. A mapping relationship between the PLCP header information and the scrambling sequence is random and may be changed. The PLCP header mode information may include STBC mode indication, SGI/LGI mode indication, and repetition mode indication.

(2) The STA 2 650 sends a data frame to the STA 1 600.

The STA 2 650 may send the data frame including a PLCP header 620-1 that has been generated based on PLCP header mode information transmitted through the CTS-to-self frame 610. If such a method is used, the PLCP header 620-1 may be generated adaptively depending on channel conditions. Medium efficiency can be increased because the length of a PLCP header is reduced in the case of a close distance or an excellent channel state.

(3) The STA 1 600 sends ACK 630 to the STA 2 650.

The STA 2 650 may send the ACK frame 630 to the STA 2 650 if the data frame 620 generated by the STA 1 600 is received without an error.

Furthermore, if the STA 1 600 has a data frame to be transmitted to the STA 2 650, the STA 1 600 may generate the PLCP header 620-1 of the data frame based on PLCP header mode information transmitted through the CTS-to-self frame 610.

The PLCP header information may be transmitted using an RTS frame, a CTS frame, and a CTS-to-self frame as described with reference to FIGS. 4 to 6, but may be transmitted using management frames used in scanning/authentication/association steps. For example, the PLCP header information may be transmitted through a probe request frame and a probe response frame. The PLCP header information may be transmitted through an information element of a management frame.

Figure 7:
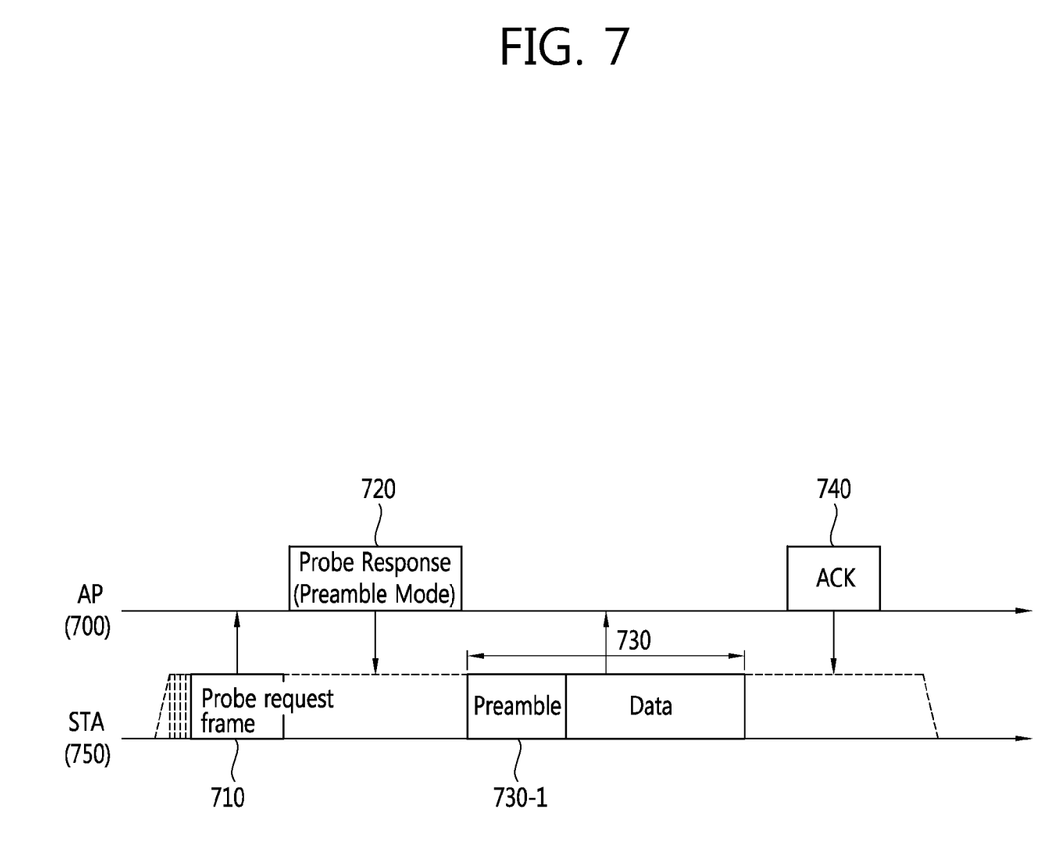
FIG. 7 is a conceptual diagram showing a method of transmitting PLCP header mode information through a management frame in accordance with an embodiment of the present invention.

FIG. 7 is a conceptual diagram showing a method of transmitting PLCP header mode information through a management frame in accordance with an embodiment of the present invention.

Referring to FIG. 7, (1) if an STA 750 performs active scanning, it may send a probe request frame 710 to an AP 700.

(2) The AP 700 may send a probe response frame 720, including PLCP header mode information as an information element, to the STA 750 in response to the probe request frame 710.

The probe response frame 720 may include an information element indicative of PLCP header mode information. Hereinafter, in an embodiment of the present invention, PLCP header mode information included as an information element of a management frame is defined and used as a PLCP header mode Information Element (IE).

Figure 8:
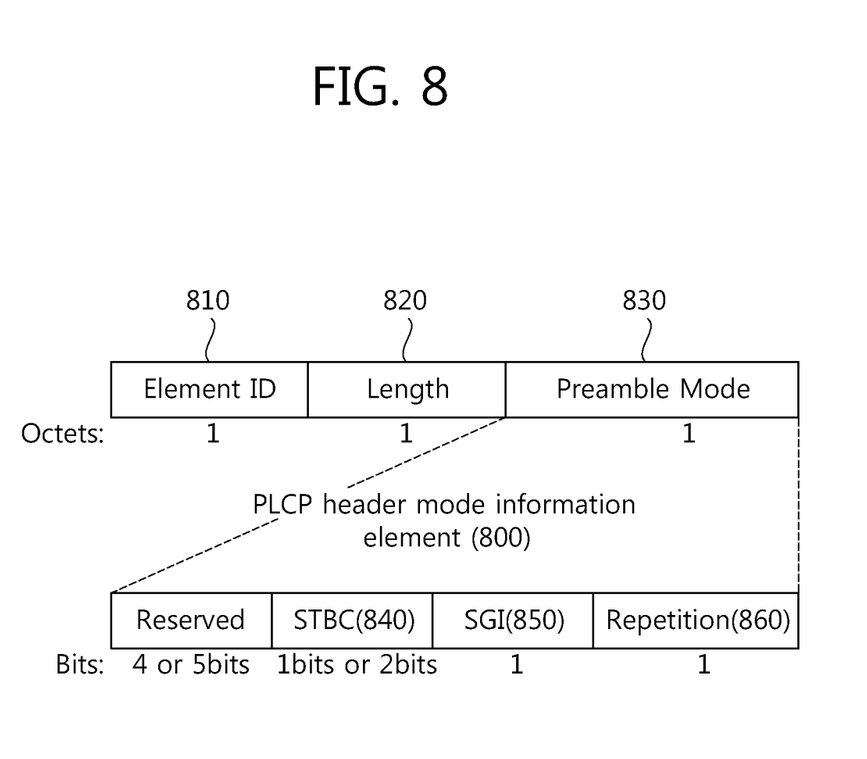
FIG. 8 is a conceptual diagram showing a PLCP header mode information element in accordance with an embodiment of the present invention.

FIG. 8 is a conceptual diagram showing a PLCP header mode information element in accordance with an embodiment of the present invention.

Referring to FIG. 8, the PLCP header mode information element 800 may include an element ID 810, a length 820, and preamble mode 830.

The element ID 810 may include indication information for classifying information elements included in a frame, and the length 820 may include information about the size of data assigned to information elements.

The preamble mode 830 may include STBC 840, an SGI 850, and repetition 860.

The STBC 840 may indicate STBC mode information used in the PLCP header of a data frame.

The SGI 850 may indicate the type of a GI used in the PLCP header.

The repetition 860 may indicate whether coding will be used or not using repetition in the PLCP header.

As described above, the PLCP header mode information may include only some of the STBC 840, the SGI 850, and the repetition 860 or may additionally include another indication information in addition to the STBC 840, the SGI 850, and the repetition 860.

Referring to back FIG. 7, (3) The STA 750 may receive a probe response frame 720 including a PLCP header mode information element and send a data frame 730, generated based on the PLCP header mode information element, to the AP 740.

If an authentication process and an association process are omitted for convenience of description, the STA 750 may generate the PLCP header of a data frame based on the PLCP header mode information element transmitted by the AP 700.

(4) If the data frame 730 is received without an error, the AP 700 sends ACK 740 to the STA 750.

When sending a data frame, the AP 700 may send the data frame 730 including a PLCP header generated based on a PLCP header mode information element, to the STA 750.

In FIG. 7, an example in which the probe response frame 720 including the PLCP header mode information element is transmitted has been described, but the PLCP header mode information element may be transmitted using another management frame (e.g., a probe request frame).

For example, the probe request frame 710 including the PLCP header mode information element may be transmitted in order to send information about preamble mode of a data frame to be received by the AP 700.

Figure 9:
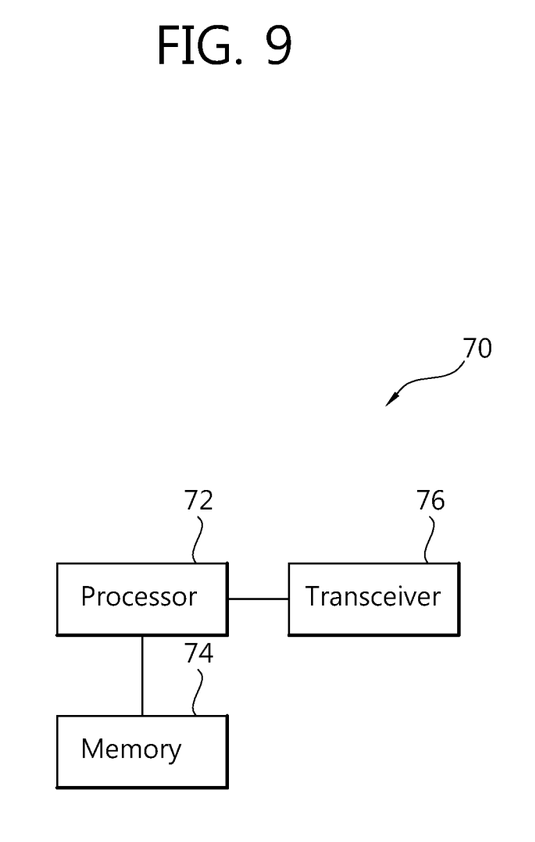
FIG. 9 is a block diagram showing a wireless device to which an embodiment of the present invention may be applied.

FIG. 9 is a block diagram showing a wireless device to which an embodiment of the present invention may be applied.

The wireless device 70 is a terminal that may implement the aforementioned embodiments and may be an AP or a non-AP STA.

The wireless device 70 includes a processor 72, memory 74, and a transceiver 76. The transceiver 76 transmits/receives radio signals, and the physical layer of IEEE 802.11 is implemented in the transceiver 76. The processor 72 is functionally connected to the transceiver 76 and implements the MAC layer and physical layer of IEEE 802.11. The processor 72 may demodulate PLCP header mode information based on the scrambling sequence of a received frame or an information element included in a received frame and may generate a data frame including a PLCP header generated based on the PLCP header mode information. That is, the processor may perform an operation for performing the aforementioned embodiments of the present invention.

The processor 72 and/or the transceiver 76 may include Application-Specific Integrated Circuits (ASICs), other chipsets, logic circuits and/or data processors. The memory 74 may include Read-Only Memory (ROM), Random Access Memory (RAM), flash memory, memory cards, storage media and/or other storage devices. The transceiver 76 may include baseband circuits for processing radio signals. When the embodiment is implemented in software, the aforementioned scheme may be implemented as a module (process or function) that performs the aforementioned function. The module may be stored in the memory 74 and executed by the processor 72. The memory 74 may be placed inside or outside the processor 72 and may be connected to the processor 72 using a variety of well-known means.

What is claimed is:

1. A method for generating a Physical Layer Convergence Protocol (PLCP) header of a data frame, the method comprising:
    demodulating PLCP header mode information based on a scrambling sequence of a received frame or an information element included in the received frame; and
    transmitting a data frame comprising a PLCP header generated based on the PLCP header mode information,
    wherein the PLCP header mode information includes at least one indication of Space Time Block Coding (STBC) mode indication, Short Guard Interval (SGI) mode indication, or repetition mode indication,
    wherein the STBC mode indication indicates Space Time Block Coding (STBC) used to generate the PLCP header of the data frame when the STBC mode indication is included in the PLCP header mode information,
    wherein the SGI mode indication indicates whether a guard interval used to generate the PLCP header of the data frame is a Long Guard Interval (LGI) or a Short Guard Interval (SGI) when the SGI mode indication is included in the PLCP header mode information, and
    wherein the repetition mode indication indicates whether or not the PLCP header of the data frame has been repeatedly generated when the repetition mode indication is included in the PLCP header mode information,
    wherein the STBC mode indication is demodulated based on B0 and B1 of a first 7 bits B0, B1, B2, B3, B4, B5, and B6 of the scrambling sequence of the received frame,
    wherein the SGI mode indication is demodulated based on B2 of the first 7 bits of the scrambling sequence of the received frame,
    wherein the repetition mode indication is demodulated based on B3 of the first 7 bits of the scrambling sequence of the received frame.

2. The method of claim 1, wherein the received frame is a Clear To Send (CTS) frame.

3. The method of claim 1, wherein:
    the information element is information included in a data payload of the received frame and includes an STBC field including the STBC mode indication, an SGI field including the SGI mode indication, and a repetition field including the repetition mode indication, and
    the received frame is a probe response frame.

4. The method of claim 1, wherein the PLCP header mode information is information determined adaptively depending on channel conditions.

5. A wireless terminal, comprising:
    a radio frequency (RF) unit that transmits and receives radio signals; and
    a processor operatively coupled to the RF unit and configured to:
    demodulate PLCP header mode information based on a scrambling sequence of a received frame or an information element included in the received frame, and
    transmit a data frame including a PLCP header generated based on the PLCP header mode information,
    wherein the PLCP header mode information includes at least one indication of Space Time Block Coding (STBC) mode indication, Short Guard Interval (SGI) mode indication, or repetition mode indication,
    wherein the STBC mode indication indicates Space Time Block Coding (STBC) used to generate the PLCP header of the data frame when the STBC mode indication is included in the PLCP header mode information,
    wherein the SGI mode indication indicates whether a guard interval used to generate the PLCP header of the data frame is a Long Guard Interval (LGI) or a Short Guard Interval (SGI) when the SGI mode indication is included in the PLCP header mode information, and
    wherein the repetition mode indication indicates whether or not the PLCP header of the data frame has been repeated and generated when the repetition mode indication is included in the PLCP header mode information,
    wherein the STBC mode indication is demodulated based on B0 and B1 of a first 7 bits B0, B1, B2, B3, B4, B5, and B6 of the scrambling sequence of the received frame,
    wherein the SGI mode indication is demodulated based on B2 of the first 7 bits of the scrambling sequence of the received frame,
    wherein the repetition mode indication is demodulated based on B3 of the first 7 bits of the scrambling sequence of the received frame.

6. The wireless device of claim 5, wherein the received frame is a Clear To Send (CTS) frame.

7. The wireless device of claim 5, wherein:
    the information element is information included in a data payload of the received frame and comprises an STBC field including the STBC mode indication, an SGI field including the SGI mode indication, and a repetition field including the repetition mode indication, and
    the received frame is a probe response frame.

8. The wireless device of claim 5, wherein the PLCP header mode information is information determined adaptively depending on channel conditions.

* * * * *